Patented Oct. 17, 1950

2,525,777

UNITED STATES PATENT OFFICE 2,525,777

BUTENYLENE BIS(AMMONIUM HALIDES)

Peter L. de Benneville, Philadelphia, Pa., assignor to Rohm & Haas Company, Philadelphia, Pa., a corporation of Delaware No Drawing. Application June 29, 1949, Serial No. 102,141

4 Claims. (Cl. 260—567.6)

This invention relates to N,N,N',N'-tetramethyl-N,N'- bis-alkylbenzyl-N,N'-2-butenylene-1,4-bis(ammonium halides) and to a process by which these bis quaternary ammonium halides are prepared. They are powerful bacteriostatic, bactericidal, and fungicidal agents.

These compounds are defined by the formula

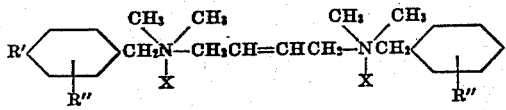

wherein R' is an alkyl group of seven to nine carbon atoms, R" is hydrogen or the methyl group, and X is a halogen, particularly bromine or chlorine, having an atomic weight between 35 and 80.

These compounds are prepared by reacting together in a molar ratio of about one to two 1,4-bis(dimethylamino)-2-butene and an alkylbenzyl halide in which the alkyl group has seven to nine carbon atoms. The two reactants may be combined directly or they may be reacted by addition in the presence of an inert organic solvent such as benzene, toluene, xylene, isopropyl alcohol, butyl alcohol, isopropyl ether, a nitroparaffin such as nitromethane, acetonitrile, formamide, or the like. Temperatures from 20° C. up to 140° C. may be used for the reaction. Solvents, when used, are generally removed by distillation at normal or reduced pressure and the bis quaternary salt is recovered as a residue. Some of the quaternary salts are precipitated or crystallized from the solvents.

Preparation of 1,4 - bis(dimethylamino) - 2-butene is described by Willstatter and Wirth, Ber. 46, 537 (1913), dibromobutene being reacted with dimethylamine. Other methods of preparation will be evident to those skilled in the art and may be used to yield this starting material.

Alkylbenzyl halides having alkyl groups of the required size are prepared in accordance with the method described in our application Serial No. 28,274, filed May 20, 1948. As there described, alkylbenzyl halides are obtained by halomethylating an alkylbenzene or an alkyltoluene by reaction with anhydrous formaldehyde and hydrogen chloride or bromide in the presence of a catalyst mixture formed from one molecular proportion of zinc chloride and 1.5 to 8 molecular proportions of an aliphatic monocarboxylic acid of one to three carbon atoms, such as formic, acetic, chloracetic, or propionic. An acid anhydride may be used in place of these acids or in admixture therewith. Formaldehyde may be used as a gas or as a revertible polymer. The equivalent of formaldehyde and hydrogen bromide or hydrogen chloride is obtained by use of bromomethyl ether or chloromethyl ether, which are conveniently prepared by known methods and reacted with an alkylbenzene of the required size.

For halomethylation of alkylbenzenes or alkyltoluenes having alkyl groups of seven to nine carbon atoms from one to 2.5 molecular equivalents of formaldehyde together with 0.75 to 2.5 molecular proportions of zinc chloride taken with 1.5 to 8 molecular proportions of aliphatic monocarboxylic acid per mole of zinc chloride are used per mole of an alkylbenzene or alkyltoluene. These components are mixed and stirred at temperatures of 50° to 100° C. and hydrogen chloride or bromide is passed in. Alternatively, the alkylbenzene and catalyst mixture are stirred together and a halomethyl ether added with observance of the defined proportions. With a heptyl benzene it is advisable for best yields to work at the lower end of the temperature range with an upper proportion of monocarboxylic acid within the designated range. Yields improve with increasing size of alkyl group. By this procedure good yields of alkylbenzyl halides are obtained with introduction almost entirely of a single halomethyl group and without formation of troublesome resinous products.

For preparation of the alkyl-benzyl halides there are required alkylbenzenes or alkyltoluenes of the proper size. The exact form of the alkyl group is not important, nor is the orientation of this group relative to the halomethyl group or to the methyl group of an alkyltoluene of particular significance. The alkyl group may be of straight or branched chain structure and may be primary, secondary or tertiary. This group may be introduced by known methods. For example, an acyl halide may be used to introduce an acyl group into the phenyl ring, which is then reduced. Olefinic hydrocarbons of the required size may be reacted with benzene or toluene in the presence of an acidic catalyst.

The useful starting alkylbenzenes are heptylbenzene, octylbenzene, nonylbenzene, heptyltoluene, octyltoluene, and nonyltoluene in their various isomeric forms. Typical of these are (1-methylhexyl) benzene, (1-ethylpentyl)-benzene, (1,3-dimethyl-1-propylbutyl) benzene, (1-methylheptyl) benzene, (2-ethylhexyl) benzene, (3,5,5-trimethylhexyl) benzene, o-, m-, or p-octyltoluene, p-(1-methylheptyl) toluene, p-(1-ethylpentyl) toluene, (1,3,3-trimethylbutyl)-benzene, and the like. Mixtures of such hydrocarbons may be used as well as individual alkylbenzenes or alkyltoluenes.

Typical preparations of alkylbenzyl halides follow. Parts shown are by weight.

*Example 1.*—To a mixture of 70 parts of 2-ethylhexylbenzene (prepared according to the method of Sulzbacher and Bergmann, J. Org. Chem. 13, 303 (1948)), 50.3 parts of anhydrous zinc chloride, and 60 parts of glacial acetic acid there was added with stirring 42.5 parts of dichloromethyl ether over the course of an hour, while the reaction mixture was maintained at 60° C. Stirring was continued for another two hours with the temperature held at 60° C. Layers were then allowed to form and separated. The product layer was washed with sodium bicarbonate solution and distilled at 110°–125° C./0.07 mm. The distillate corresponded in composition to 2-ethylhexylbenzyl chloride.

*Example 2.*—To a mixture of 138 parts by weight of toluene and 90 parts of anhydrous hydrogen fluoride, contained in a copper flask and held at 0°–10° C., there was added 336 parts of mixed octenes, boiling at 123°–134° C., at such a rate that the temperature did not rise above 10° C. The reaction mixture was stirred for an hour and then poured upon ice. The organic layer was separated, washed with water, with 5% sodium bicarbonate solution, and again with water, dried over calcium chloride, and finally distilled. Unreacted toluene and octene were removed and the organic liquid stripped by heating to 115° C./35 mm. There was then obtained a fraction between 135° C./35 mm. and 155° C./0.5 mm. which consisted essentially of octyltoluenes.

A mixture was made in the reaction vessel equipped with a stirrer of 32 parts of octyltoluene, 25 parts of anhydrous zinc chloride, and 60 parts of glacial acetic acid. With the temperature kept at 50° to 60° C. there was added thereto 20 parts of dichloromethyl ether. The temperature of the mixture was then raised to 90° C. for three hours. The reaction mixture was then separated into layers. The product layer was washed with water, with a 5% sodium bicarbonate solution, and again with water. Upon distillation a fraction was obtained at 133°–148° C./0.3 mm. which corresponded in composition to 2-methyl-5-octylbenzyl chloride.

*Example 3.*—Commercial diisobutyl carbinol was dripped slowly over a bed of alumina at 400° C. The vapors were taken off and condensed. Therefrom nonene was separated and distilled at 72°–75° C./100 mm. The product, containing by analysis 85.7% of carbon and 14.3% of hydrogen, was 2,6-dimethyl-3-heptene, for which the theoretical content of carbon is 85.8% and of hydrogen is 14.3%.

There was added 135 parts by weight of this product to a stirred mixture of 159 parts of benzene and 147 parts of sulfuric acid. The temperature was held between 0° and 10° C. After the mixture had been stirred for three hours, it was allowed to form layers. The upper layer was distilled and the distillate redistilled at 102°–106° C./3 mm. This distillate had a molecular weight of 203 (theory 204) and corresponded in composition to nonylbenzene. The yield was 95 parts.

To a mixture of 80 parts of nonylbenzene, 40 parts of zinc chloride, and 59 parts of glacial acetic acid there was added at room temperature 45 parts of dichloromethyl ether. The mixture was stirred and heated at 70° C. for three hours. It was then allowed to stand and form layers. The upper layer was separated, washed with hot water, and with sodium bicarbonate solution, dried over sodium sulfate, and distilled. The fraction distilling at 141°–142° C./2 mm. was nonylbenzyl chloride.

*Example 4.*—To a mixture of 184 parts of toluene and 103 parts of sulfuric acid there was added 112 parts of octene while the mixture was stirred and held at 5°–13° C. The octene had been prepared by dehydration of capryl alcohol on an alumina catalyst (cf. Komarewsky, Ulick, and Murray, J. Am. Chem. Soc. 67, 557 (1945)). The reaction mixture was stirred for three hours at room temperature, and the product layer was separated. It was washed twice with concentrated sulfuric acid and distilled. The fraction taken at 93°–95° C./0.3 mm. corresponded in composition to sec.-octylmethylbenzene.

To a mixture of 81 parts of this product, 47.5 parts of anhydrous zinc chloride, and 65 parts of glacial acetic acid there was added 46 parts of dichloromethyl ether while the mixture was stirred and held at 50°–60° C. for an hour. It was stirred at 70°–75° C. for four hours and allowed to form layers. The upper layer was separated, washed with water and sodium bicarbonate solution, and distilled. The fraction taken at 130°–150° C./0.3 mm. amounted to 43.8 parts and corresponded in composition to methyloctylbenzyl chloride.

*Example 5.*—Commercial 3-heptanol was dehydrated on an alumina catalyst at 400° C. to yield a mixture of 2-heptene and 3-heptene which was condensed and distilled.

There were mixed 125 parts of this product, 198 parts of benzene, and 196 parts of concentrated sulfuric acid while the mixture was stirred and held at 5° C. The mixture was stirred for three hours with the temperature of the mixture being allowed to advance above room temperature. Layers were permitted to form and the upper layer was taken. It was twice washed with sulfuric acid and distilled to yield 167 parts of heptylbenzene, probably a mixture of 2-heptylbenzene and 3-heptylbenzene. The product had a carbon content of 87.3% and a hydrogen content of 11.7%, compared with theoretical values of 88.6% and 11.7% respectively.

There were mixed 160 parts of this product, 90 parts of anhydrous zinc chloride, and 138 parts of glacial acetic acid. Thereto was added at 60° C. 106 parts of dichloromethyl ether. The mixture was stirred for four hours and then allowed to stand and separate into layers. The upper layer was washed with water, with sodium bicarbonate solution, and with water and then distilled. At 127°–132° C./2 mm. there was obtained a fraction of 128 parts which corresponded in composition to heptylbenzyl chloride.

*Example 6.*—A mixture of 95 parts by weight of octylbenzene (chiefly 2-octylbenzene with some 3-octylbenzene), 30 parts of paraformaldehyde, 54 parts of anhydrous zinc chloride, and 120 parts of glacial acetic acid was stirred at 50° C. while hydrogen chloride was passed in for two hours at a fairly rapid rate. The reaction mixture was allowed to stratify and the upper layer was taken, washed with hot water, with a 10% sodium bicarbonate solution, and with hot water, dried over sodium sulfate and distilled. The forerun of 30 parts consisted of octylbenzene. There was then obtained at 119°–121° C./1 mm. 71 parts of octylbenzyl chloride.

*Example 7.*—To a mixture of 46.5 parts of octylbenzene (chiefly 2-octylbenzene), 17 parts of anhydrous zinc chloride, and 40 parts of glacial acetic acid there was added dropwise 50 parts of bis-bromomethyl ether. The mixture was stirred and heated at 70° C. for four hours in all. Layers were allowed to form and were separated. The upper layer was washed with hot water, with 10% sodium bicarbonate solution, and with water. It was dried over sodium sulfate and distilled. At 155°-174° C./2 mm. there was obtained a fraction corresponding in composition to octylbenzyl bromide. It contained by analysis 28.8% of bromine. Theory for this product is 28.3%.

In the following examples the reaction of alkylbenzyl halides and 1,4-bis(dimethylamino)-2-butene is illustrated.

Example 8.—There were mixed 135 parts of heptylbenzyl chloride and 42.6 parts of 1,4-bis(dimethylamino)-2-butene in 250 parts of benzene. The mixture was heated at reflux temperature for three hours. The benzene was then removed by distillation and stripped off by heating on a steam bath under low pressure. There was obtained a residue amounting to 180 parts which on analysis was found to contain 11.4% of chlorine. The compound obtained was N,N,N',N,-tetramethyl-N,N'-bis(heptylbenzyl) - N,N'-2-butenylene-1,4-bis(ammonium chloride).

This compound has a phenol coefficient of 300 against *Salmonella typhosa* and of 1000 against *Staphylococcus aureus*. It effectively inhibits germination of spores of *Sclerotinia fructicola* and *Macrosporium sarcinaeforme* at dilutions of 0.001% to 0.005%.

The method shown above when applied to the reaction of hexylbenzyl chloride and bis(dimethylamino)-2-butene leads to the comparable tetramethyl bis-hexylbenzyl butenylene bis(ammonium chloride). This compound has far less bactericidal activity than the above heptylbenzyl compound, the phenol coefficient therefor being below 100.

Example 9.—There were mixed 71 parts by weight of bis(dimethylamino)-2-butene and 238 parts of p-(1-methylheptyl)benzyl chloride in 600 parts of benzene. The mixture was heated at reflux temperature for four hours. The solvent was then removed by distillation with stripping at reduced pressure. The product was obtained as a residue. It corresponded in composition to N,N,N',N'- tetramethyl -N,N'-p-1-methylheptylbenzyl-2- butenylene -1,4- bis(ammonium chloride).

The phenol coefficient of this product is 775 against *Salmonella typhosa* and 855 against *Staphylococcus aureus*.

Example 10.—There were mixed 35.5 parts of bis(dimethylamino)-2-butene and 142 parts of p-2-octylbenzyl bromide in 250 parts of benzene. The mixture was stirred and heated with vigorous reflux for 2.5 hours. The solvent was removed by distillation and N,N,N',N'-tetramethyl-N,N'-p-octylbenzyl-2-butenylene-1,4-bis(ammonium bromide) obtained as a residue. It has a phenol coefficient of 950 against *Staphylococcus aureus* and 800 against *Salmonella typhosa*. It is an effective fungicide.

Example 11.—There were mixed 126 parts of p-(1-isopropyl-4-methylpentyl)-benzyl chloride, 35 parts of 1,4-bis(dimethylamino)-2-butene, and 250 parts of toluene. The mixture was heated at reflux temperature for two hours. The product was obtained in the form of light pink crystals, which were separated and dried. They contained by analysis 10.72% of ionizable chlorine (theory 10.98%). This product was N,N,N',N'-tetramethyl- N,N'-bis (p-1-isopropyl-4-methylpentylbenzyl) -2- butenylene-1,4-bis(ammonium chloride). It has phenol coefficients of 555 against *Salmonella typhosa* and of 500 against *Staphylococcus aureus*.

It is of interest that when the comparable salt was made from a decylbenzyl chloride and bis(dimethylamino)-2-butene by the same procedure the product had a phenol coefficient of 42 against *Staphylococcus aureus*.

Example 12.—There were mixed 35 parts of bis(dimethylamino)-2-butene, 125 parts of 2-methyl-5-sec.-octylbenzyl chloride, and 300 parts of benzene. The mixture was heated under reflux for five hours. The benzene was distilled off under reduced pressure. The product obtained corresponds in composition to N,N,N',N'-tetramethyl -N,N'- bis(2-methyl-5- sec.-octylbenzyl) - 2-butenylene-1,4-bis(ammonium chloride). It has a phenol coefficient of 800 against *Salmonella typhosa* and of 850 against *Staphylococcus aureus*.

The group of bis quaternary ammonium chlorides and bromides here claimed comprises peculiarly effective bactericides and fungicides. The high degree of effectiveness rests in large part upon the size of the alkyl substituent of the benzyl groups, as is evident from the data. The halides as prepared above may be converted to other quaternary salts by interchange of another anion for the halide, such as pentachlorophenate, nitrophenate, acetate, sulfate, and the like.

By an alternative method for the preparation of the N,N,N',N'-tetramethyl-N,N'-bis(alkylbenzyl) -N,N'-2- butenylene -1,4- bis(ammonium halides) there are reacted two moles of an alkylbenzyldimethylamine and one mole of 1,4-dibromo-2-butene or 1,4-dichloro-2-butene. As above the alkyl group must contain seven to nine carbon atoms. The conditions for effecting this reaction are essentially the same as for the reaction of 1,4-bis(dimethylamino)-2-butene and an alkylbenzyl halide.

Typical preparations of alkylbenzyldimethylamines follow:

Example 13.—(a) To a solution of 8 parts of sodium hydroxide in 30 parts of water there was added 22.5 parts of an aqueous 40% dimthylamine solution. The reaction vessel in which this mixture was formed carried a refluxing system cooled with dry ice and acetone. To the mixture there was added 22.5 parts of heptylbenzyl chloride. The mixture was heated to give gentle refluxing and dimethylamine gas was slowly passed in during a period of three hours. The reaction mixture was allowed to form layers which were separated. The product layer was washed with water until neutral to litmus and heated under reduced pressure. There was obtained 20 parts of a light yellow oil which had the proper analysis for heptylbenzyldimethylamine.

(b) The procedure of Example 13 (a) was followed with substitution of 25.3 parts of nonylbenzyl chloride in place of the 22.5 parts of heptylbenzyl chloride. There was obtained 18 parts of product which corresponded by nitrogen analysis to nonylbenzyldimethylamine.

The procedure was repeated with p-1,3,5,5-tetramethylpentylbenzyl chloride and a similar product obtained, p-(1,3,5,5-tetramethylpentyl)-benzyldimethylamine.

(c) The procedure of Example 13 (a) was followed with use of 23.8 parts of p-2-octylbenzyl chloride as the alkylbenzyl halide. The product obtained was (2-octylbenzyl)dimethylamine.

An alkylbenzyldimethylamine and a dihalobutene are reacted at 20° to 140° C. with or without an organic solvent. Typical of this reaction are the following examples.

*Example 14.*—There were mixed 63 parts of p-(1-methylheptyl)benzyldimethylamine, 43 parts of 1,4-dibromo-2-butene, and 125 parts of benzene. The mixture was heated under reflux for sixteen hours and the solvent stripped off. There was obtained a residue which corresponded in composition to N,N,N',N'-tetramethyl-N,N'-bis-p-(1-methylheptyl)benzyl - 2 - butenylene-1,4-bis(ammonium bromide). This product has a phenol coefficient of 970 against *Staphylococcus aureus* and of 810 against *Salmonella typhosa*.

I claim:

1. As new chemical substances, compounds of the formula:

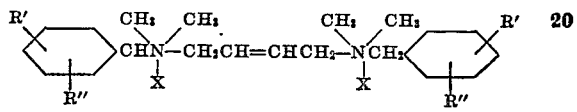

wherein R' is an alkyl group of seven to nine carbon atoms, R'' is a member of the class consisting of hydrogen and the methyl group, and X is a member of the class consisting of chlorine and bromine.

2. As a new chemical substance, N,N,N',N'-tetramethyl-N,N'-bis(nonylbenzyl) - 2 - butenylene-1,4-bis(ammonium chloride).

3. As a new chemical substance, N,N,N',N'-tetramethyl-N,N'-bis(octyl benzyl) - 2 - butenylene-1,4-bis(ammonium chloride).

4. As a new chemical substance, N,N,N',N'-tetramethyl-N,N'-bis(octyl benzyl) - 2 - butenylene-1,4-bis(ammonium bromide).

PETER L. DE BENNEVILLE.

No references cited.